United States Patent [19]

Schmidt

[11] 4,373,718

[45] Feb. 15, 1983

[54] FLEXIBLE CORK HANDLE-WRAPPING STRIP

[76] Inventor: Donald H. Schmidt, 14745 Major Ave., Oak Forest, Ill. 60452

[21] Appl. No.: 266,748

[22] Filed: May 26, 1981

Related U.S. Application Data

[63] Continuation-in-part of Ser. No. 167,697, Jul. 11, 1980, abandoned.

[51] Int. Cl.³ .................. G05G 1/04; C08G 51/20; A63B 49/08; A63B 53/14
[52] U.S. Cl. .................. 273/75; 273/81.5; 273/72 R; 74/558.5; 428/40
[58] Field of Search .................. 273/72 R, 73 J, 75, 273/81 R, 81.5, 81.6, DIG. 15, 63 A; 260/9, 17.4 R; 43/23; 74/551.9, 558.5, 558

[56] References Cited

U.S. PATENT DOCUMENTS

| | | | |
|---|---|---|---|
| 1,441,986 | 1/1923 | Lard | 273/81.6 |
| 2,288,686 | 7/1942 | Daniels | 273/81 R X |
| 2,339,121 | 1/1944 | Van Cleef | 273/81 R X |
| 2,365,508 | 12/1944 | Austin | 260/9 X |
| 2,583,198 | 1/1952 | Axton | 273/75 |
| 3,078,097 | 2/1963 | Mitchell | 273/63 A |
| 3,271,031 | 9/1966 | Mitchell | 273/63 A |
| 3,406,130 | 10/1968 | Neff | 260/9 X |
| 3,821,135 | 6/1974 | King | 260/9 |

FOREIGN PATENT DOCUMENTS 870021  6/1961  United Kingdom .............. 273/81.6

*Primary Examiner*—George J. Marlo
*Attorney, Agent, or Firm*—Garrettson Ellis

[57] ABSTRACT

A flexible, elongated handle-wrapping strip for tennis racquets, bicycle handlebars, baseball bats, fishing poles, or any other desired use which comprises a first layer of a composite of cork granules, the cork granules being plasticized with a liquid organic polyol and bonded to each other in a flexible plastic binder material. A second layer of contact adhesive is provided on one side of the first layer, while a third, peel-sheet layer overlies the contact adhesive layer for peeling away, to expose the contact adhesive layer for use. The handle-wrapping strip may be helically wound with the parallel edges of adjacent coils being in contact with each other. The adhesive layer is in the form of a flexible plastic sheet coated on both sides with an adhesive. The first layer includes 40 parts by weight of the cork granules plasticized with 3 to 20 parts by weight of the liquid polyol. The wrapping strip may also include a plastic layer of 0.01 to 0.05 inch thickness between the layer of cork and the adhesive.

21 Claims, 4 Drawing Figures

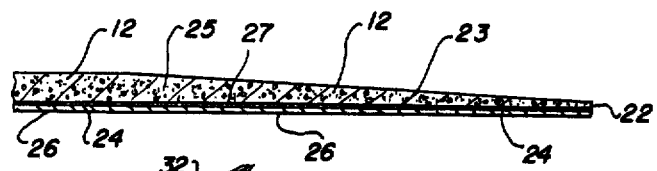
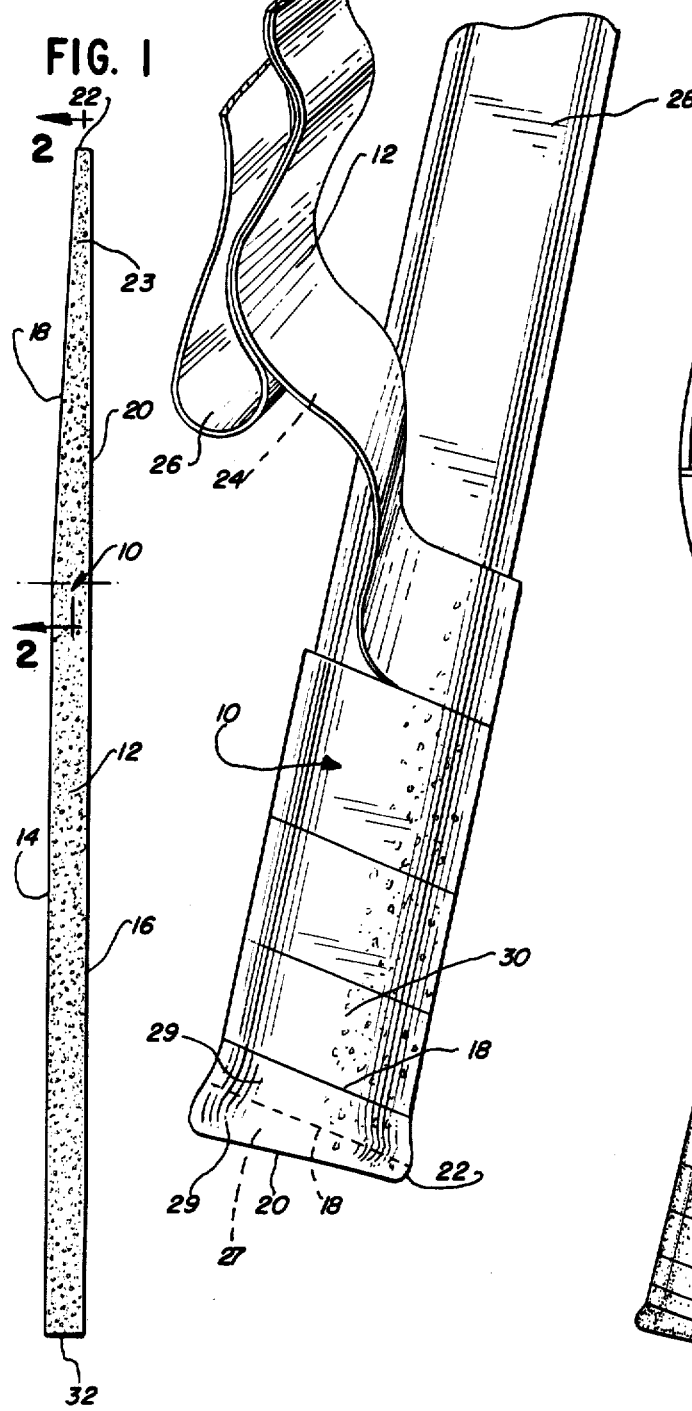
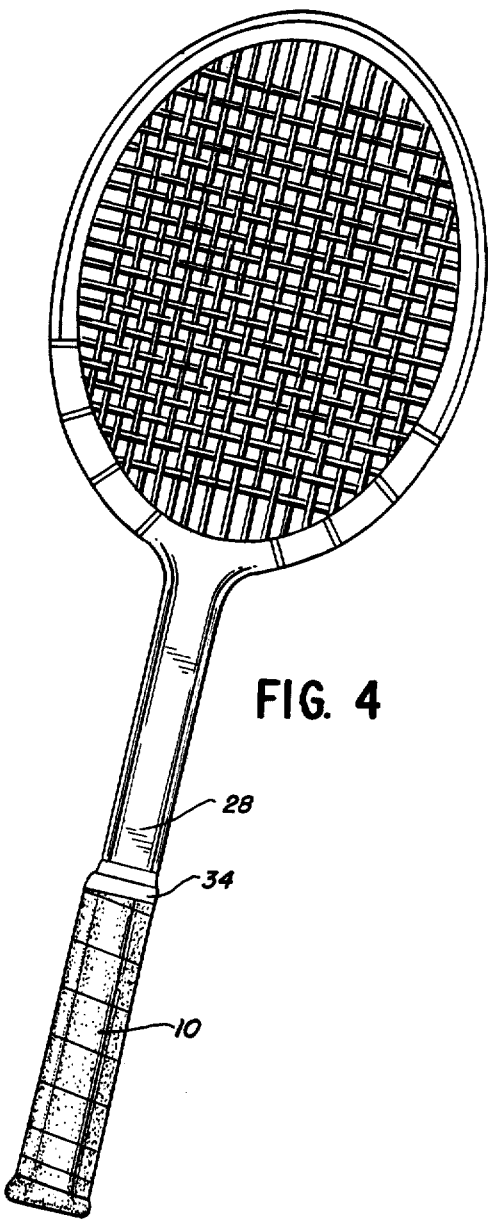

FLEXIBLE CORK HANDLE-WRAPPING STRIP

CROSS-REFERENCE TO RELATED APPLICATION

This application is a continuation-in-part of U.S. Application Ser. No. 167,697, filed July 11, 1980, now abandoned.

BACKGROUND OF THE INVENTION

This application relates to a novel hand grip member which is a flexible cork composite strip that may be helically wound about the handle of tennis racquets, golf clubs, baseball bats, bicycle handlebars, luggage handles, fishing poles, or any other desired use.

Conventionally, leather or plastic wrappings are placed around handles of tennis racquets, luggage, and the like, where a heavy load or strenuous activity calls for softness and resiliency of the grip. However, upon such strenuous activity, the handle can become slippery, due to sweat or other moisture. Also, tender hands can get blisters on the irregularities which normally form on leather or plastic wrappings, particularly with tennis racquets and the like.

The flexible cork handle-wrapping strips of this invention provide to the handle a distinct feeling of compressability, which can avoid shock. This can be advantageous for baseball bats, and other articles where shock can sting or jolt the hands. Furthermore, the handle carrying the cork strip of this invention has a soft feel, with very high friction. The presence of water from sweat or the like can be absorbed by the cork handle made in accordance with this invention.

As a further advantage of the handle made from the strip of this invention, after winding of the strip onto the handle in a helical manner, it may be buffed with sandpaper to provide a very smooth surface on which the junctions between the various coils of the wound, handle-wrapping strip are practically undetectable. Furthermore, when the handle made from the handle-wrapping strip of this invention becomes dirty, it may be cleaned up by a quick rubbing of sandpaper, so that it looks new again.

Also, the handle-wrapping strip of this invention may be removed from the handle without difficulty, and replaced with a new strip when that is desired.

While cork handles have been used on fishing rods and the like previously, such handles have generally been made of a solid piece of cork, rather than a flexible strip in accordance with this invention, which provides the desirable benefits of a cork handle at a very low cost, and may be easily applied to any handle to provide it with the characteristics of cork.

DESCRIPTION OF THE INVENTION

In accordance with this invention, an elongated, flexible, handle-wrapping strip is provided which comprises a first layer of a composite of cork granules. The cork granules are plasticized with a liquid organic polyol, and bonded together in a flexible plastic binder material.

A second layer of contact adhesive is positioned on one side of the first layer, so that the flexible strip may be wound around and adhered to a handle. Optionally, this contact adhesive layer may comprise a thin sheet of flexible plastic such as polyester or polyethylene, coated on both sides with the adhesive, so that it adheres to the cork and presents an adhesive outer surface. Such a plastic sheet can provide added strength to the cork composite. A third, peel-sheet layer may overlie the contact adhesive layer. Accordingly, the peel-sheet layer may be peeled away to expose the contact adhesive layer when the strip of this invention is desired for use.

Preferably, the handle-wrapping strip of this invention has parallel edges, and at least one end defines an angled edge and a second edge. The second edge defines an extension of one of the parallel edges, with the angled edge and the second edge converging together at the one end to form a narrowed end adjacent the second end. The end which converges to a narrowed end assists in the initiation of the winding process of the strip of this invention, so that the helically wound wrapping strip on a handle may start with a flat end due to the presence of the converging end on the strip.

Preferably, the first layer of the elongated, handle-wrapping strip of this invention comprises, per 40 parts by weight of cork granules, from 3 to 20 parts by weight of the liquid organic polyol plasticizer for the cork; from 2 to 50 parts by weight of an organic plasticizer for polyvinyl chloride; and from 6 to 62 parts by weight of polyvinyl chloride resin.

The organic polyol plasticizer for the cork may preferably be glycerine or alternatively diethylene glycol, but other suitable materials containing a plurality of hydroxyl groups for compatibility with the cork may be used including propylene glycol and higher glycol polymers such as triethylene glycol, dipropylene glycol, and copolymers of ethylene and propylene glycol. Preferably the molecular weight of the liquid organic polyol plasticizer is not more than about 200, so that the liquid polyol can easily flow into intimate relationship with the cork granules, rendering them flexible and reducing the natural, brittle characteristic of dry cork granules.

The polyvinyl chloride resin utilized herein is commercially available from numerous sources, and, to form a flexible binding material, must be plasticized with a known organic plasticizer for polyvinyl chloride. Many dozens of different plasticizers are known and commercially available, and, generally, any known plasticizer which forms a flexible plastic with polyvinyl chloride may be used. Good results have been achieved with the phthalate diester plasticizers, particularly butylbenzylphthalate. Other plasticizers may also be used to achieve equivalent results, for example dioctylphthalate, di-2-ethylhexyl adipate, dibutylsebacate, diisodecylphthalate, tricresylphosphate, trioctyltrimellitate, triethylenegylcol dihexanoate, and dozens of other types of known plasticizers.

In the alternative, the flexible plastic binder material used in this invention may be a flexible polyurethane resin, an organic rubber such as natural latex, polybutadiene, polyisoprene, or any other commercial rubber stock which can be cured under conditions not harmful to the cork, or other flexible resins.

The elongated handle-wrapping strip of this invention preferably has a first layer that includes from 4 to 10 parts by weight of the polyol plasticizer, specifically glycerine or diethylene glycol, per 40 parts of cork granules.

Also, the handle-wrapping strip of this invention preferably includes from 10 to 30 parts by weight of polyvinyl chloride resin, per 40 parts by weight of cork granules, plus 10 to 25 parts by weight of a diester plasticizer for the resin, specifically butylbenzylphthalate.

It is generally preferable for the cork granules to be predominantly of a size between ⅛ and 1/18 inch, and for the first layer to be from 1/32 to ⅛ inch thick, to provide the desired resilient softness to the handle around which the strip of this invention is wound. The strip also can provide sufficient bulk so that the wound strip mounted on the handle may be smoothed with sandpaper, to provide a surface which feels as if it is made of a smooth and unitary single piece of cork.

In the drawings,

FIG. 1 is a plan view of the elongated, handle-wrapping strip of this invention.

FIG. 2 is a transverse sectional view of a portion of the strip of FIG. 1.

FIG. 3 is a fragmentary perspective view of a tennis racquet handle being wound with the handle-wrapping strip of FIG. 1, to form the desired cork handle.

FIG. 4 is a plan view of the tennis racquet of FIG. 3 after the strip of this invention has been wound on the handle.

Referring to th drawings, FIG. 1 illustrates the handle-wrapping strip 10 of this invention, showing the first layer 12 of the plasticized cork granules bonded together in the flexible plastic binder material.

Strip 10 defines parallel edges 14, 16. At one end of the strip, an angled edge 18 is defined, plus a second edge 20. The angled edge 18 and a second edge 20 converge together at the one end 22 to form a narrowed end 22 adjacent second edge 20. Edge 20 is typically an extension of edge 16, so that the narrowed end 22 is off center at one side of strip 10 as shown.

FIG. 2 shows an enlarged cross section of strip 10, with first cork composite layer 12 carrying a second layer 24 of contact adhesive or commercial pressure-sensitive adhesive of conventional formulation on one side thereof. Adhesive 24 is carried on both sides of a thin sheet of biaxially oriented polyester film (Mylar), one such layer adhering the film to the cork composite. A third, peel-sheet layer 26 of a commercially available type, adapted to be compatible with the contact adhesive 24, overlies contact adhesive layer 24 while the strip is being stored. Then, when it is desired to use strip 10, peel-sheet layer 26 may be removed, as shown in FIG. 3, to expose the contact adhesive layer 24 for winding the cork composite strip of this invention.

It may also be desirable to precoat the side of first cork composite layer 12 which carries second layer 24 of adhesive with an intermediate layer 27 of plastic such as vinyl latex or the like. This plastic layer can serve as a superior adhesive bed for the second layer 24, so that it adheres even better to the first cork composite layer 12, and also such an optional intermediate layer 27 can add strength to the entire assembly. For example, a vinyl latex layer can be applied by conventional rolling, spraying or brushing that dries to a layer of vinyl plastic which is 0.01 to 0.05 inch thick, specifically 0.03 inch thick. For example, one may use coating materials from the Northwest Chemical Company of Oak Creek, Wis., such as the formulation sold under the number 2205, which is a brown colored material, or a clear coating sold under the number CPD 232. Any compatible plastic material may be utilized as a substitute for the specifically disclosed vinyl material for optional intermediate layer 27.

After application of such an intermediate layer 27 onto the surface of first layer 12, the second layer 24, and third layer 26 may be applied in the manner described herein.

Segment 23 of first layer 12, positioned along about the first 1 or 2 inches of strip 10 from end 22, may optionally be feathered from its normal thickness of typically about 0.02 to 0.06 inch at area 25 to a thickness of typically about 0.005 to 0.01 inch at end 22.

Strip 10 of this invention is flexible, so that it can wind in a tight helix about a cylindrical or otherwise elongated handle 28, as shown in FIGS. 3 and 4. For purposes of winding one may conveniently begin by stripping away any old covering on the handle of tennis racquet 28 or any other desired handle, and then peel away the adjacent portion of peel-sheet 26, and lay end 22 of strip 10 transversely across the end of handle 28 as shown in FIG. 3, with second edge 20 pointing away from the direction in which the wound helix will be placed.

One then can wind strip 10 about the handle about essentially 360°, with feathered segment 23 preferably being about the length of the first winding 27.

A second winding 29 of strip 10 may then be placed on top of first winding 27 as shown, to seal the first winding to the handle end. Thereafter in subsequent windings angled edge 18 comes into play, with the third coil 30 of the helical winding of strip 10 being laid down with its edge in contact with angled edge 18 of second winding 29, and subsequent windings being positioned in similar manner. Thus, the helical pattern is readily defined by the strip of this invention, with the user carefully winding the successive coils up the handle until the desired portion of the handle is covered with the strip of this invention.

Preferably, the length of angled edge 18 is sufficient to provide at least two 360° coils about the particular handle to be wound. The particular angle of edge 18 to the longitudinal axis of strip 12 can define, in turn, the pitch of the helical winding, as can be seen from FIG. 3, with that angle being preferably selected to be from about 2° to 30°, for example 3° to 4°.

At the termination of the helical winding, the strip 10 of this invention can be cut with a razor blade or sharp knife to form another angled apex at its opposite end 32 similar to that at end 22. If desired such an angled configuration may be defined beforehand at end 32 of strip 12. However, with the configuration shown, handles of varying lengths can be wound, while a strip in accordance with this invention having two tapered ends may be less versatile for winding differently sized handles.

Angled edge 18 is also advantageous when the outer end of the handle has an enlarged end portion 29 as shown in FIG. 3, since, the thinner, tapered portion of strip 12 may wind about the enlarged end portion 29 with a better fit than the remaining, wide portion of strip 12. One may terminate the winding inwardly at any desired length.

The inner end of the wound strip 10 may be surrounded with plastic tape 34 or the like to retain the wound end in secured position. Generally, end portion 29 does not require tape with this winding technique.

Also, one may buff the cork surface of the handle with sandpaper, which tends to obliterate the junctions between the individually wound coils, making the structure look and feed essentially like a unitary piece of cork, providing a soft, high-friction, resilient, absorbent handle surface which may be buffed off with sandpaper to look like new whenever desired. Particularly, the area of second winding 29 which covers first winding 27 may be buffed to even it out as desired.

The material of the first layer 12 of the strip of this invention may be made in the following manner, or in a manner analogous to that which is described below:

Fifty pounds of polyvinyl chloride (Geon 121, sold by B. F. Goodrich) is mixed with 30 pounds of butylbenzylphthalate (Santicizer 160, sold by Monsanto), and 10 pounds of diethylene glycol.

The above mixture is mixed well, and 60 pounds of the above mixture is added to 40 pounds of #8/18 ground cork. The preceding number implies that the ground cork is of a particle size which can pass through a Tyler-mesh screen with 8×8 holes per inch, but cannot pass through a Tyler-mesh screen with 18×18 holes per inch.

Another and preferred mixture may be prepared by placing 40 pound of #8/18 ground cork into a mixer and adding 5 pounds of glycerine. It has been found to be desirable to premix the glycerine and cork to allow the glycerine time to soak into the cork.

After the glycerine has soaked into the cork, 30 pounds of a mixture made from 50 pounds of polyvinyl chloride and 30 pounds of butylbenzylphthalate plasticizer are added to the cork and glycerine, and the above mixture mixed well.

Following this, either of the above mixtures may be further processed in the manner described below.

After mixing, 50 pounds of the chosen mixture are placed in a hollow steel block having a chamber of the dimensions $24\frac{1}{2} \times 36\frac{1}{2} \times 3\frac{1}{2}$ inches. A tightly fitting plunger is placed into the mouth of the above hollow opening, and pressed inwardly to compress the composite mass within the hollow block to a pressure of about 27 pounds per cubic foot. The plunger is then locked in position to maintain this pressure.

Then the hollow steel block is placed in a gasfired oven for four hours at 300° F.

During this period of time the butylbenzylphthalate enters into plasticizing relation with the polyvinyl chloride, and simultaneously the diethylene glycol or glycerine, which is incompatible in terms of miscibility with the plasticized polyvinyl chloride, is substantially all absorbed into the cork to soften it, if not previously absorbed. The absorption is enhanced by the incompatibility of diethylene glycol or glycerine with the plasticized polyvinyl chloride, as well as the pressure.

Because of the incompatibility of the diethylene glycol or the glycerine with the plasticized polyvinyl chloride, the diethylene glycol or glycerine also tends to be retained in the cork and not migrate out, so that the cork does not readily dry out.

This provides a significant advantage over certain other known particulate cork formulations made, for example, of gelatin glue where the cork is plasticized with glycerine. Because gelatin glue is compatible with glycerine in terms of miscibility, the glycerine can migrate out of the cork into the glue, causing the cork to dry out, to become brittle, and to shrink. Thus the use of an incompatible resin causes the polyol plasticizer for cork to remain in the cork with less outward migration, so that the cork remains resilient.

After the four-hour heating stage, the steel block is allowed to cool to about room temperature, and then opened. The cork composition block is then removed. It is desirable to cool the cork composition to about 30° C. or below prior to removing the pressure, so that the cork composition retains much of its compressed state even after removal from the block.

The block of cork composition may be then sliced into sheets of the desired thickness by use of a commercial slicing machine. For example, a desirable thickness of the first layer of this invention may be 0.02 to 0.1 inch, and preferably about 0.03 to 0.06 inch. The sheets of cork may then be coated on one side with the desired pressure-sensitive adhesive layer 24, for example MAC-TAC IB1160 of the Morgan Adhesive Company, which has a Mylar polyester central membrane coated with adhesive on both sides. Any other suitable adhesive which is preferably strongly adhesive to the plastic binder material (in this case, the vinyl resin) may also be used, with or without a plastic central membrane. Thereafter, the adhesive layer 24 may be overlaid with a commercially available peel-sheet layer 26 and cut into the desired strips, which may typically be one inch wide and 36 inches long, being tapered as shown in FIG. 1 at one end, if desired.

It is of note that the pressure-adhesive layer 24 is primarily bonded to the vinyl binder, so that even if the pressure-sensitive adhesive is not very compatible with cork, the system can still work effectively, since the cork granules are generally encapsulated in the vinyl binder.

The above has been offered for illustrative purposes only, and is not intended to limit the invention of this application, which is as defined in the claims below.

That which is claimed is:

1. An elongated, flexible handle-wrapping strip which comprises a first layer of a composite of cork granules, each 40 parts by weight of said cork granules being plasticized with 3 to 20 parts by weight of a liquid organic polyol and bonded together in a flexible plastic binder material; a second layer of adhesive on one side of the first layer, said adhesive layer comprising a flexible plastic sheet coated on both sides with said adhesive and bonded on one side to said first layer; and a third, peel-sheet layer overlying the adhesive layer for peeling away to expose the adhesive layer for use.

2. The elonaged handle-wrapping strip of claim 1 having parallel edges, in which at least one end defines an angled edge and a second edge, said second edge defining an extension of one of said parallel edges, said angled edge and second edge converging together at said one end to form a narrowed end adjacent said second edge.

3. The elongated handle-wrapping strip of claim 2, wound on a handle in helical manner with the parallel edges of adjacent coils in contact with each other.

4. The elongated, handle-wrapping strip of claim 1 in which said first layer comprises, per 40 parts by weight of cork granules, from 3 to 20 parts by weight of said liquid organic polyol plasticizer for the cork; from 2 to 50 parts by weight of an organic plasticizer for polyvinyl chloride; and from 6 to 62 parts by weight of polyvinyl chloride resin.

5. The elongated, handle-wrapping strip of claim 4 in which said first layer includes from 4 to 10 parts by weight of said polyol plasticizer.

6. The elongated, handle-wrapping strip of claim 5 in which said polyol plasticizer is glycerine.

7. The elongated, handle-wrapping strip of claim 4 in which said first layer includes from 10 to 30 parts by weight of polyvinyl chloride resin and from 10 to 25 parts by weight of an organic diester plasticizer for said resin.

8. The elongated, handle-wrapping strip of claim 7 in which said diester plasticizer is butylbenzylphthalate.

9. The elongated, handle-wrapping strip of claim 1 in which said cork granules predominantly are of a size between ⅛ and 1/18 inch.

10. The elongated handle-wrapping strip of claim 1 in which said first layer is from 0.02 to 0.1 inch thick.

11. The elongated, handle-wrapping strip of claim 1 in which said liquid organic polyol is incompatible in terms of miscibility with the flexible plastic binder material, to suppress migration of the polyol from the cork granules to the binder material.

12. An elongated, handle-wrapping strip which comprises a first layer of a composite of cork granules which are predominantly of a size between ⅛ and 1/18 inch, said first layer being from 0.02 to 0.1 inch thick, said cork granules being plasticized with a liquid organic polyol and bonded together in a flexible plastic binder material, said first layer comprising, per 40 parts by weight of cork granules, from 3 to 20 parts by weight of said liquid organic polyol plasticizer for the cork; from 2 to 50 parts by weight of an organic plasticizer for polyvinyl chloride; and from 6 to 62 parts by weight of polyvinyl chloride resin; a second layer of adhesive on one side of the first layer, and a third peel-sheet layer overlying the adhesive layer for peeling away to expose the adhesive layer for use, said strip having parallel edges, and at least one end thereof defining an angled edge and a second edge, said second edge defining an extension of one of the said parallel edges, the angled and the second edges converging together at said one end to form a narrowed end adjacent said second edge.

13. The elongated, handle-wrapping strip of claim 12 in which said liquid organic polyol is incompatible in terms of miscibility with the flexible plastic binder material, to suppress migration of the polyol from the cork granules to the binder material.

14. The elongated, handle-wrapping strip of claim 13 in which said plasticizer for polyvinyl chloride is a phthalate diester.

15. The elongated, handle-wrapping strip of claim 12 in which a portion of said strip adjacent said narrowed end is feathered from its normal thickness to a thin end at said second edge.

16. The elongated, handle-wrapping strip of claim 12 in which said layer of adhesive comprises a flexible plastic sheet coated on both sides with said adhesive and bonded on one side to said first layer.

17. The elongated, handle-wrapping strip of claim 16 in which a plastic layer of 0.01 to 0.05 inch thickness is present between the first layer of the composite of cork granules and the second layer of adhesive.

18. The elongated, handle-wrapping strip of claim 16 in which said polyol is glycerine.

19. An elongated, handle-wrapping strip which comprises a first layer of a composite of cork granules which are predominantly of a size between ⅛ and 1/18 inch, said first layer being from 0.03 to 0.06 inch thick, said cork granules being plasticized with glycerine and bonded together in a flexible binder material, said first layer comprising, per 40 parts by weight of cork granules, from 4 to 10 parts by weight of said glycerine, from 10 to 30 parts by weight of polyvinyl chloride resin, and from 10 to 25 parts by weight of an organic plasticizer for polyvinyl chloride; an intermediate layer of adhesively-compatible plastic material having a thickness of 0.01 to 0.05 inch carried on one side of said first layer; a second layer of adhesive carried on said intermediate layer, said second layer comprising a flexible plastic sheet coated on both sides with said adhesive and bonded on one side to said first layer, and a third, peel-sheet layer overlying the contact adhesive layer for peeling away to expose the contact adhesive layer for use, said strip having parall edges and at least one end thereof defining an angled edge and a second edge, said second edge defining an extension of one of said parallel edges, the angled and the second edges converging at said one end to form a narrowed end adjacent said second edge.

20. The elongated, handle-wrapping strip of claim 19 wound on a handle in helical manner with the parallel edges of adjacent coils in contact with each other.

21. The elongated, handle-wrapping strip of claim 20 in which said intermediate layer is a polyvinyl chloride plastic.

* * * * *